United States Patent [19]

Morimoto

[11] Patent Number: 5,296,929
[45] Date of Patent: Mar. 22, 1994

[54] AUTOMATIC CORRECTION APPARATUS FOR VIDEO SIGNAL OF DIGITAL VTR

[75] Inventor: Takeshi Morimoto, Osaka, Japan

[73] Assignee: Matsushita Electric Industrial Co., Ltd., Osaka, Japan

[21] Appl. No.: 774,198

[22] Filed: Oct. 10, 1991

[30] Foreign Application Priority Data

| Oct. 31, 1990 | [JP] | Japan | 2-295751 |
| Apr. 4, 1991 | [JP] | Japan | 3-071531 |
| Jun. 14, 1991 | [JP] | Japan | 3-142951 |

[51] Int. Cl.$^5$ .............................................. H04N 5/16
[52] U.S. Cl. ................................. 358/607; 358/340; 348/691
[58] Field of Search ............... 358/167, 36, 340, 171, 358/172, 34, 35, 315, 320, 323, 327, 339; H04N 5/16, 9/89

[56] References Cited

U.S. PATENT DOCUMENTS

| 4,084,176 | 4/1978 | Trost | 358/327 |
| 4,631,600 | 12/1986 | Fukui | 358/320 |
| 4,680,624 | 7/1987 | Murakami et al. | 358/36 |
| 4,701,786 | 10/1987 | Yamanaka | 358/34 |
| 4,825,299 | 4/1989 | Okada et al. | 358/323 |
| 4,890,213 | 1/1990 | Robo et al. | 358/167 |
| 5,057,920 | 10/1991 | Wilkinson | 358/172 |
| 5,144,414 | 9/1992 | Nishi et al. | 358/36 |

FOREIGN PATENT DOCUMENTS

| 60-10880 | 1/1985 | Japan . |
| 62-15983 | 1/1987 | Japan . |
| 63-142971 | 6/1988 | Japan . |
| 2-10987 | 1/1990 | Japan . |

OTHER PUBLICATIONS 19-mm type D-2 composite format-helica data and control records, SMPTE Journal, pp. 592-600, Jul. 1990.
Representation of NTSC encoded (system M) video signal-active video portion, SMPTE Journal, pp. 586-587, Jul. 1990.

Primary Examiner—James J. Groody
Assistant Examiner—Jeffrey S. Murrell
Attorney, Agent, or Firm—Stevens, Davis, Miller & Mosher

[57] ABSTRACT

In digital VTR's, a change in levels and frequency response in the VTR analog circuits or analog transmission paths causes a problem of deterioration in the video picture quality due to quantization distortion when dubbing is repeated based on an analog video signal. In order to solve this problem, according to the present invention, a level reference signal is superposed as a predetermined digital value on an output video signal of the reproducer, then based on the reference signal, the level and the frequency response of the analog transmission path are corrected in the recorder. Thus, dubbing can be achieved by using digital VTR's without any influence of quantization distortion.

20 Claims, 14 Drawing Sheets

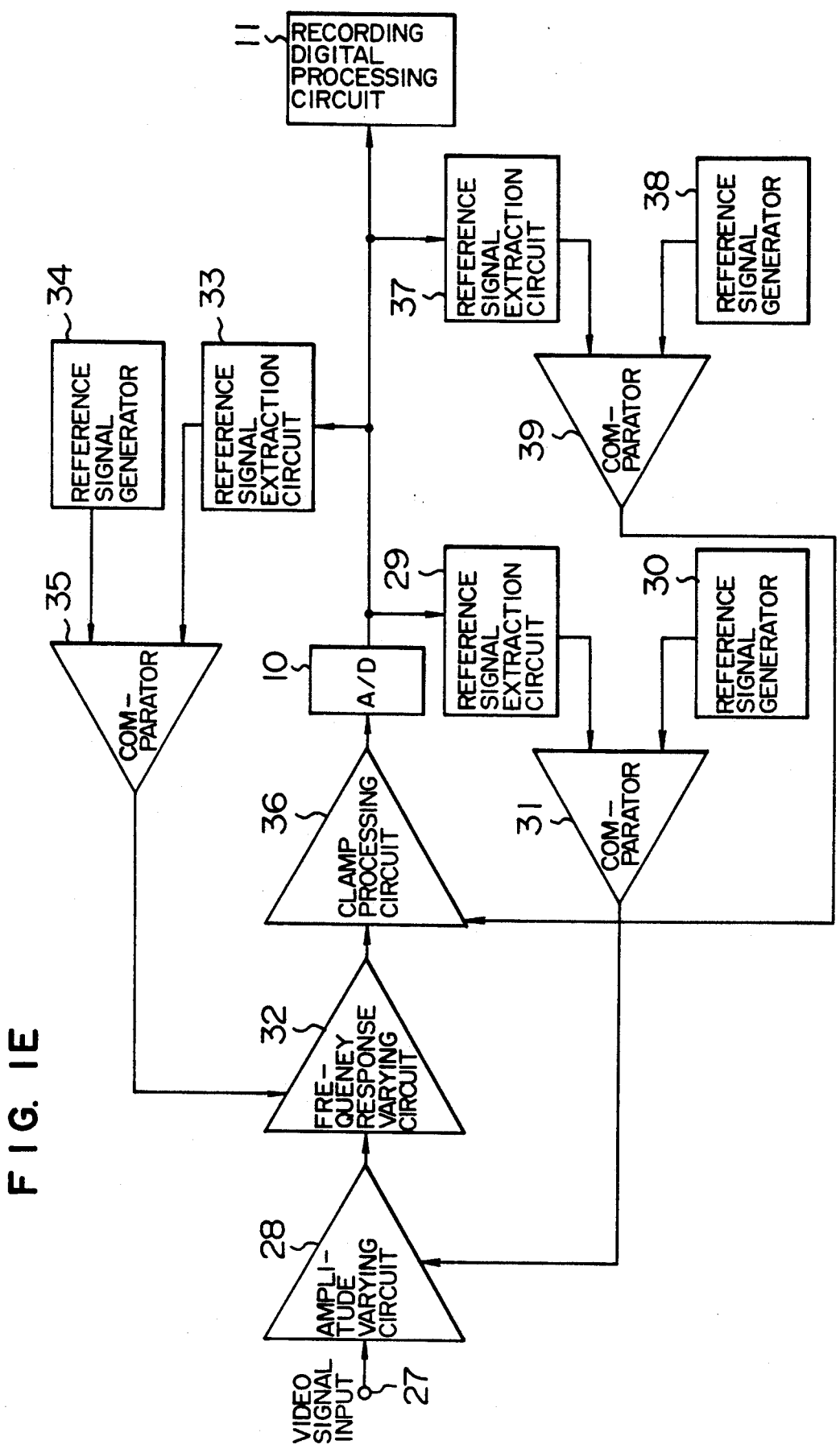
FIG. IE

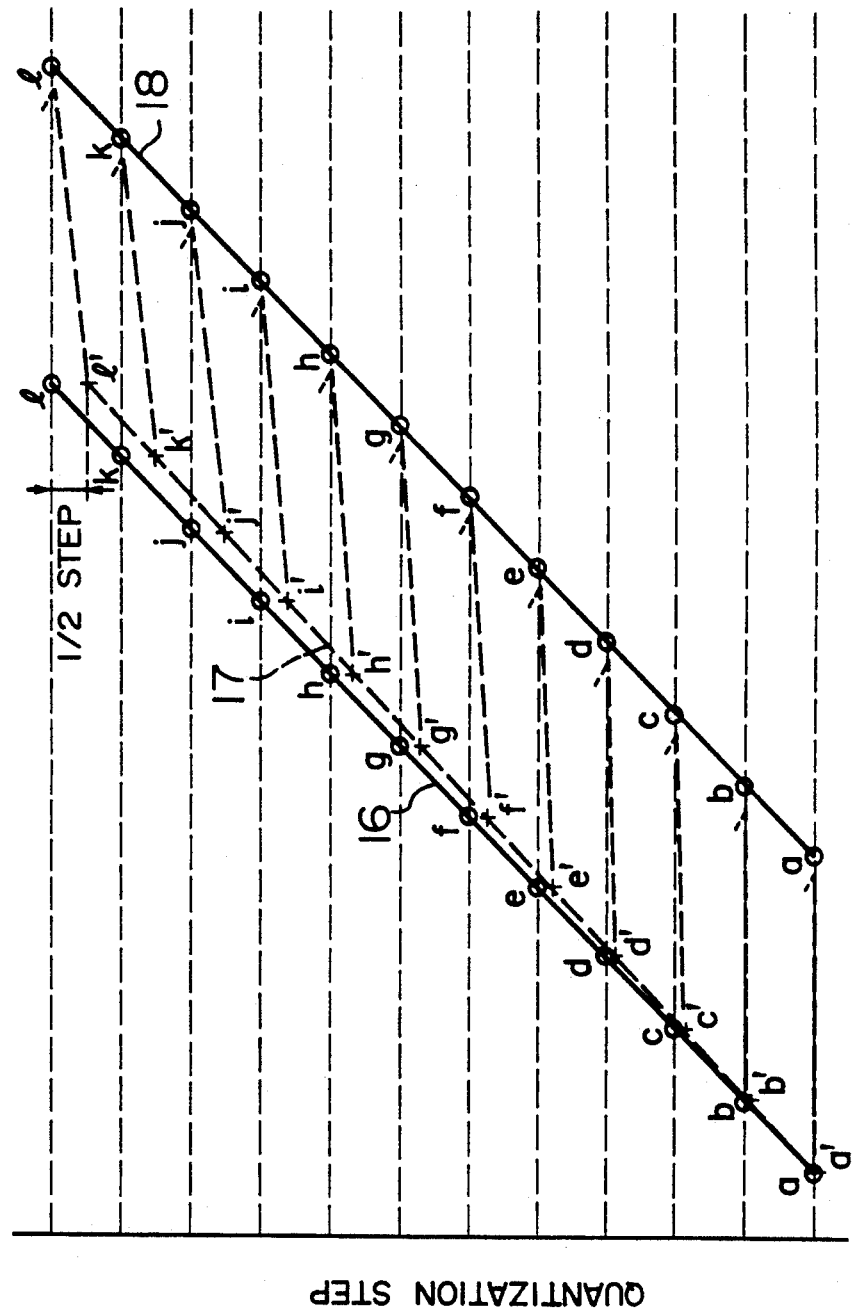

F I G. 7
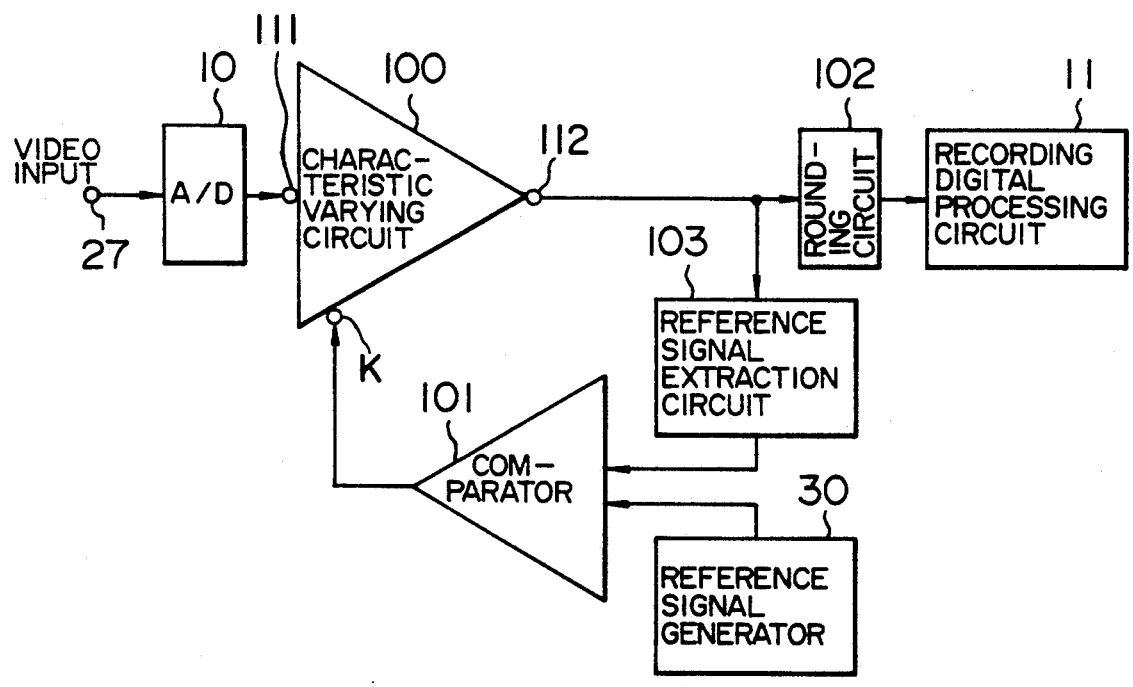

HIGH-PASS FILTER 5,296,929

AUTOMATIC CORRECTION APPARATUS FOR VIDEO SIGNAL OF DIGITAL VTR

BACKGROUND OF THE INVENTION

1. Field of the Invention

The present invention relates to an automatic correction apparatus for a video signal of a digital VTR, which is suitable for structuring a dubbing system by connecting digital VTR's in cascade to avoid quantization distortion even if there is variation in the level or the frequency response of an analog transmission path.

2. Description of the Prior Art

In the case of structuring a dubbing system using digital VTR's, it is usual that the VTR's are connected with an analog video signal path, as shown in FIG. 3.

FIG. 3 will be explained below. In FIG. 3, 1 and 2 designate digital VTR's for a reproducer and a recorder, respectively. These are connected by an analog transmission path 3. The reproducer 1 comprises a magnetic head 4, a reproducing digital processing circuit 5, a digital-to-analog converter 6 and an analog output processing circuit 7, to reproduce a video signal recorded on a magnetic tape 8.

The recorder 2 comprises an analog input processing circuit 9, an analog-to-digital converter 10, a recording digital processing circuit 11 and a magnetic head 12, for recording a video signal on a magnetic tape 13.

The analog output processing circuit 7 and the analog input processing circuit 9 have adjustable resistors 14 and 15, respectively, to adjust these circuits to an optimum state and to absorb attenuation of a signal in the transmission path 3.

The existing quantization level of a digital VTR has 8 bits, and particularly the D2VTR (refer to SMPTE 247M and 244M of the SMPTE Journal, July 1990) has allocated the levels of a video portion into 140 steps of quantization from the black level to the 100% white level.

For example, assume the case of dubbing the 100% ramp signal as shown in FIG. 4 in an analog transmission path by using the D2VTR system. As shown in FIG. 4, 8-bit digital codes (200) and (60) correspond to the 100% white level and the black level respectively in the 8-bit digital codes (0–255) of the D2VTR system.

FIGS. 5 and 6 show changes in waveforms of a ramp signal at the time of dubbing.

In FIG. 5, oblique line 16 shows a slope of an original ramp signal at the normal level. Circle marks a to l on the oblique line 16 show picture elements of the signal. It is assumed here that the quantization level increases by one step per one picture element. Oblique line 17 shows a slightly lower setting of levels of the recorder 2 in the analog-to-digital converter 10 in the dubbing system in FIG. 3, with the largest error occurring at a sample point 1 corresponding a point 1, deviated by a ½ step. However, deviations up to a ½ step become the same waveform as that of the original ramp signal as shown in sample points a to l on an oblique line 18, after the analog-to-digital converter 10.

FIG. 6 shows a case of a fairly lower setting of levels of the recorder 2 in the analog-to-digital converter 10, with errors exceeding a ½ step in sample points a to l on the oblique line 19, and an oblique line 20 shows an input waveform in the analog-to-digital converter 10. In this case, after the analog-to-digital converter 10, the signal has a stage in the middle as shown by an oblique line 21. When a ramp signal (the oblique line 21) obtained is dubbed by the same dubbing system in the same condition, a signal with a larger stage is obtained as shown in an oblique line 23.

From the above, it is understood that a large quantization distortion occurs when the adjustment of the analog circuit is deviated in the dubbing system in FIG. 3.

It is also understood from the above that it is necessary to minimize the level error to within a ½ step in order to prevent a quantization distortion from occurring and that it is necessary to minimize the gain deviation to within 1/280 (0.4%) in the dubbing system in order to prevent a quantization distortion from occurring in the 140 steps between the black level and the 100% white level of the ramp signal shown in FIG. 4.

It is almost impossible in practice to minimize the gain deviation to these values partly because of uncertain attenuation in the transmission path 3.

SUMMARY OF THE INVENTION

According to the present invention, a dubbing system having two sets of VTR's connected in cascade has the following configuration to avoid occurrence of quantization distortion.

The present invention provides an automatic correction apparatus for a video signal of a digital VTR, being a transmission path for converting a first digital video signal into an analog video signal by a digital-to-analog conversion unit, transmitting the converted signal and converting the analog video signal into a second digital video signal by an analog-to-digital conversion unit, comprising:

a reference signal superposition unit for superposing a reference signal of a predetermined digital value on to the first digital video signal;

a comparison unit for comparing the reference signal with the predetermined digital value in the second video signal; and a characteristic varying unit for varying the characteristics of the video signal, thereby to control the characteristic varying unit based on the result of comparison by the comparison unit.

With the above-described configuration, each of reference signals of an amplitude, a DC potential, frequency characteristics and a sampling phase is superposed in the form of predetermined digital value on to an output video signal of a reproducer in a dubbing system having two sets of digital VTR's connected in cascade. Then, in a recorder having a video signal connected to it through an analog transmission path, a difference is detected between a digital value of the reference signal in the digital video signal obtained by the analog-to-digital converter of the recorder and the predetermined digital value. Based on the result of this detection, the amplitude, DC potential, frequency characteristics and sampling phase of the recorder are corrected.

By the above arrangement, it is possible to correct the above characteristics even if there is a deviation in the analog circuit or an attenuation of the signal in the analog transmission path.

BRIEF DESCRIPTION OF THE DRAWINGS

FIG. 1E is an overall block diagram of the VTR record processing system for correcting the signal characteristics of the first invention;

FIG. 5 is a diagram for explaining the case where there is no distortion in the waveform of the ramp signal at the time of dubbing;

FIG. 7 is a block diagram showing the VTR record processing system for correcting the transmission characteristics of a second invention;

DESCRIPTION OF THE PREFERRED EMBODIMENTS

The above three inventions will be explained in detail in sequence.

(1) Deviations which become the cause of quantization distortion in dubbing in the analog circuit and an attenuation of the signal in the analog transmission path are corrected by the analog circuit.

(2) Deviations which become the cause of quantization distortion in dubbing in the analog circuit and an attenuation of the signal in the analog transmission path are corrected by digital calculation.

(3) Vibrations in the digital control used in (1) and (2) above are restricted.

The first invention (correction in the analog circuit) will be explained first with reference to FIG. 1 and FIG. 2.

Figure 1A:
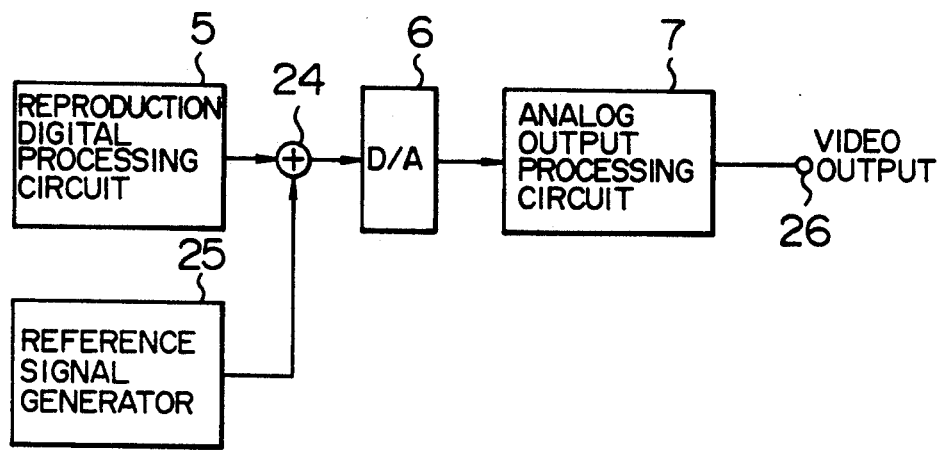
FIG. 1A is a block diagram showing the configuration of the VTR reproduction processing system of the present invention.
Figure 1B:
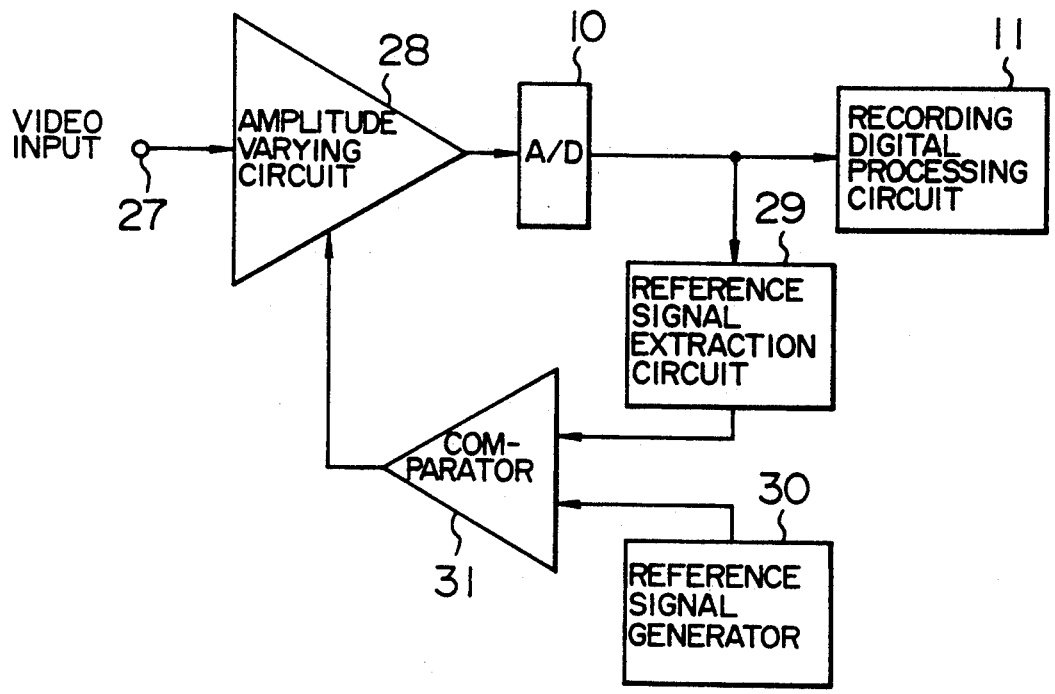
FIG. 1B is a block diagram showing the VTR record processing system for correcting the signal amplitude of a first invention.
Figure 1C:
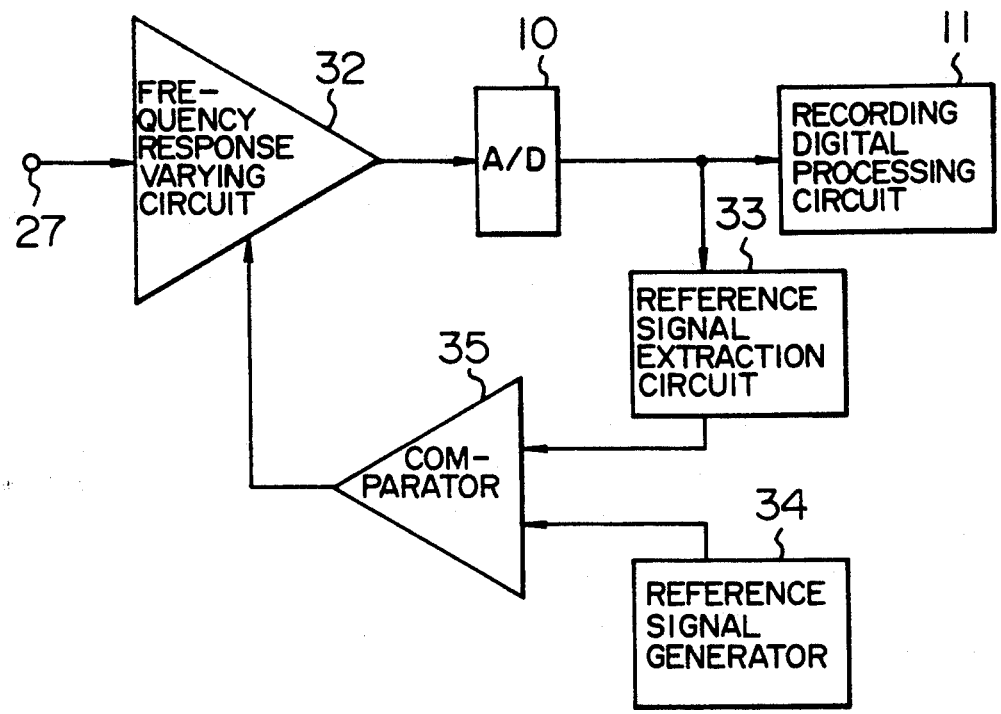
FIG. 1C is a block diagram showing the VTR record processing system for correcting the signal frequency response of the first invention.
Figure 10:
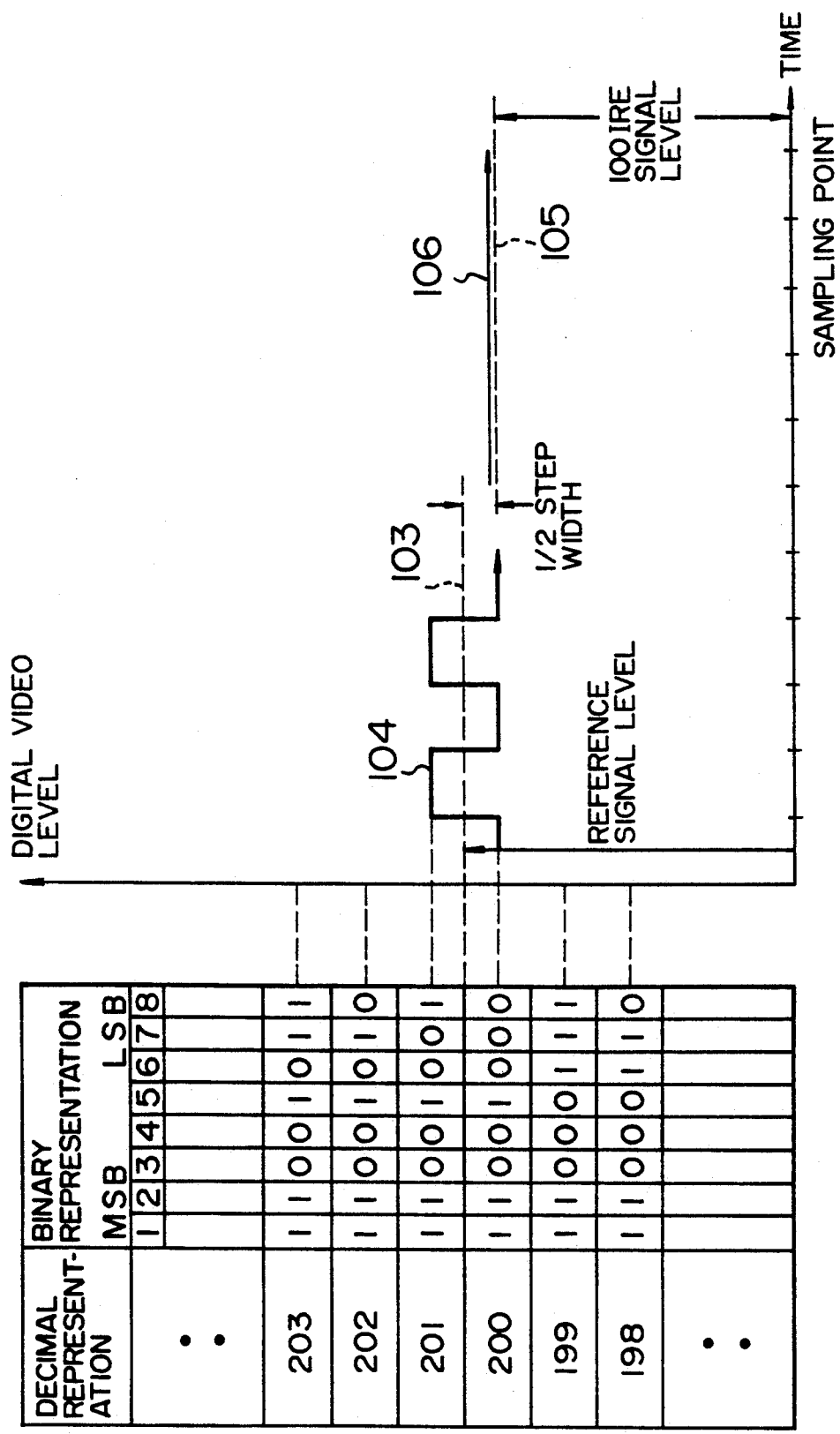
FIG. 10 is an explanatory diagram to be used for explaining the operation in a second embodiment of the third invention.

FIG. 1A is a block diagram showing the reproduction processing of a VTR signal in the automatic correction apparatus for a video signal of a digital VTR according to the present invention. FIG. 1B is a block diagram showing the record processing system of a VTR signal in the first embodiment for correcting a signal amplitude. FIG. 1C is a block diagram showing the record processing system of a VTR signal in the second embodiment for correcting signal frequency response, and FIG. 10 is a block diagram showing the record processing system of a VTR signal in the third embodiment for correcting a signal DC potential.

Figure 2:
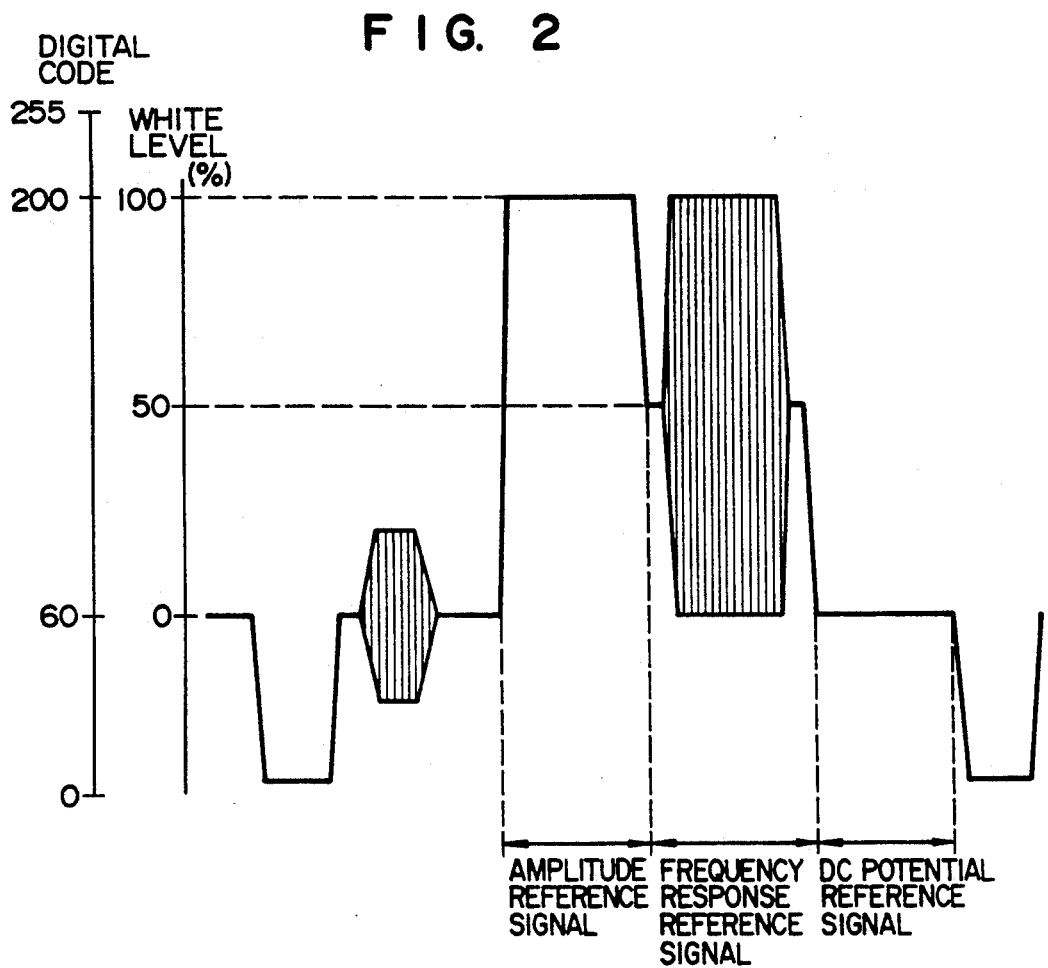
FIG. 2 is a waveform diagram showing one embodiment of the reference signal to be used in the present invention.
Figure 4:
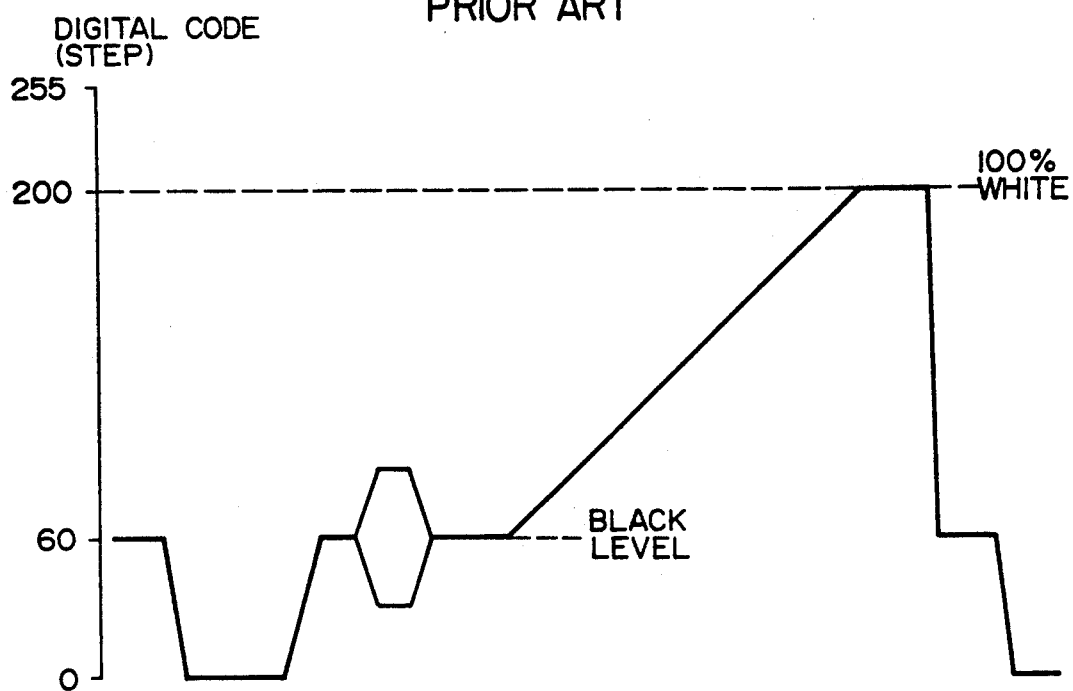
FIG. 4 shows an example of the waveform of the 100% ramp signal to be used for the explanation of the prior art example.

FIG. 2 shows one embodiment of the reference signal to be used in the present invention.

Figure 3:
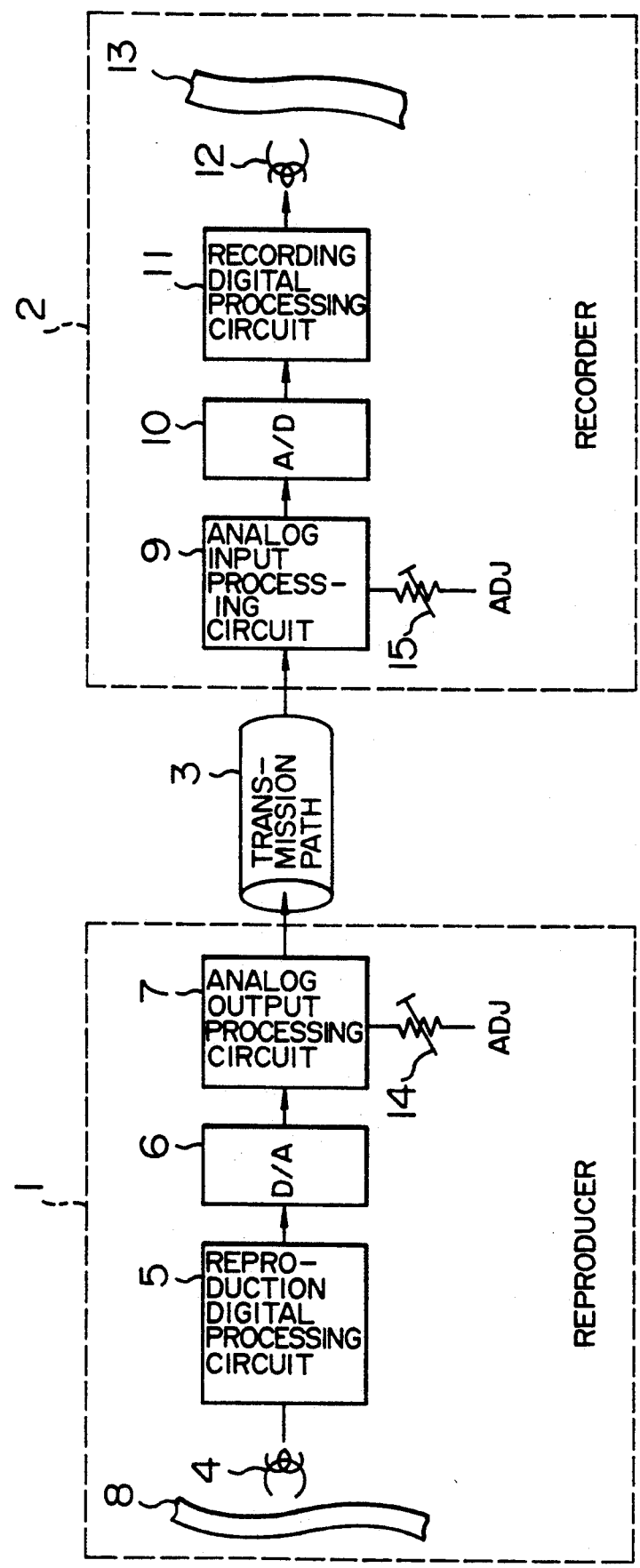
FIG. 3 shows a dubbing system using the conventional digital VTR's.
Figure 6:
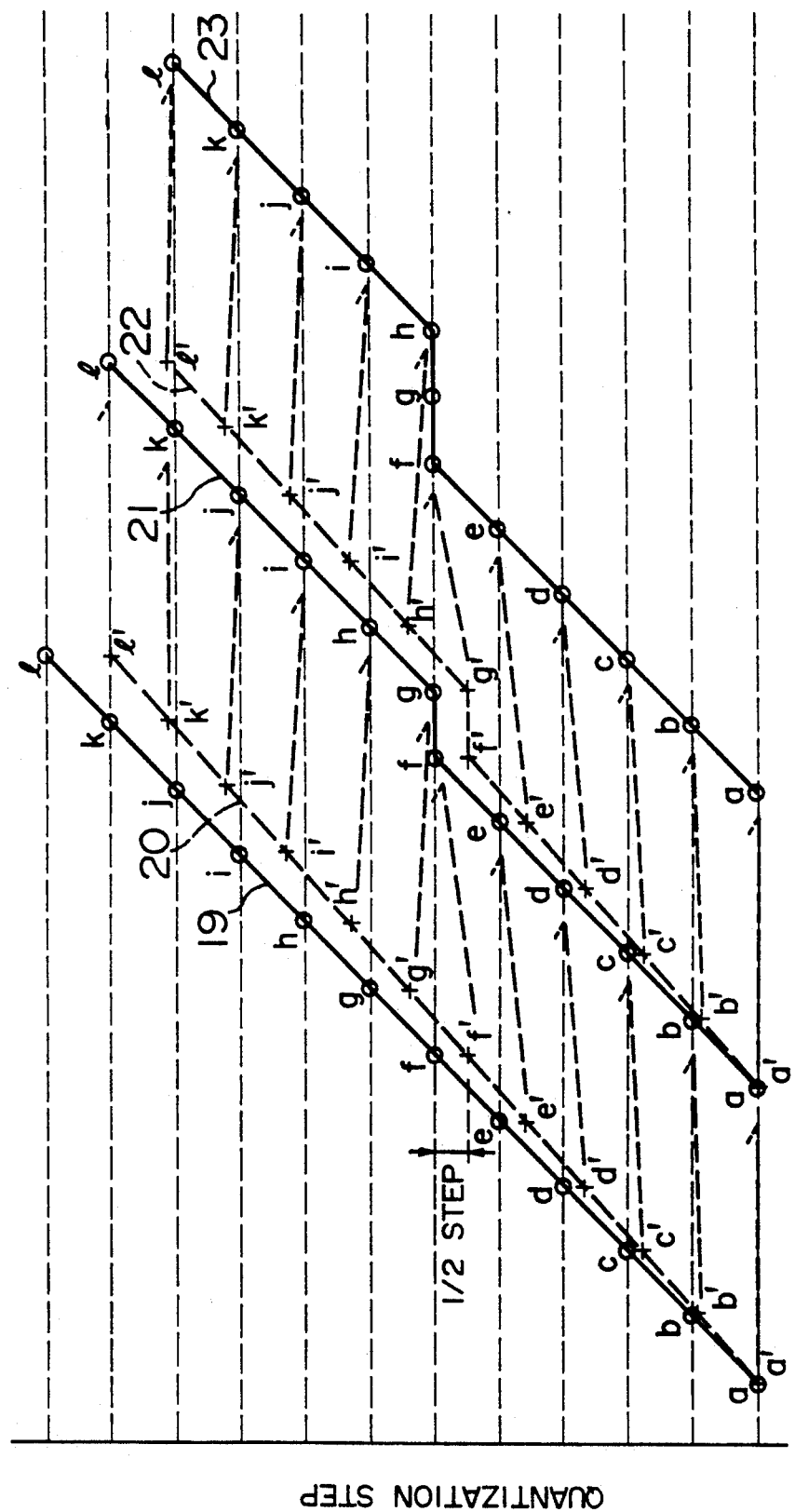
FIG. 6 is a diagram for explaining the case where there is a distortion in the waveform of the ramp signal at the time of dubbing.

In FIG. 1, symbols which are the same as those in FIG. 3 show the circuits of the same operation as that of the prior art.

Referring to FIG. 1A, a digital video signal is produced from a reproduction digital processing circuit 5 and, in a mixing circuit 24, this signal is superposed by a reference signal generated by a reference signal generator 25. The superposed signal is converted into an analog video signal by a digital-to-analog converter 6 and the result is outputted from an output terminal 26 through an analog output processing circuit 7.

The reference signal is assumed to be superposed on any one line during a vertical blanking period of the video signal. One example of the reference signal is shown in FIG. 2. The reference signal in FIG. 2 is a reference signal to be placed on one line during the vertical blanking period, and this comprises three reference signals. One is an amplitude reference signal which is a white signal of 100% white level of an NTSC signal that is obtained by converting a digital code 200 into an analog signal. A second signal is a reference signal for the frequency response, which is obtained by modulating 50% white level as a main with a color sub-carrier (3.58 MHz). Other frequency may be acceptable if it is a high-frequency signal. A third signal is a DC potential reference signal or a pedestal potential signal of 0% white level which is obtained by converting a digital code 60 into an analog signal.

FIG. 1B shows a VTR recording signal block in the case of correcting a signal amplitude of the first embodiment. It is assumed that a reproduced signal of another set of VTR to which the present invention is applied has been inputted to an input terminal 27. This video signal is converted into a digital video signal by an analog-to-digital converter 10 after the amplitude of this video signal has been controlled by an amplitude variable circuit 28. This digital video signal is supplied to a recording digital processing circuit 11 as well as to a reference signal extraction circuit 29.

Only the amplitude reference signal shown in FIG. 2 is extracted from a reference signal extraction circuit 29 and this is applied to a comparator 31. Amplitude reference signals from the reference signal extraction circuit 29 and the reference signal generator 30 are compared in the comparator 31, and the amplitude variable circuit 28 is controlled based on the error as a result of the comparison. As a result, the amplitude of the digital video signal taken in by the analog-to-digital converter 10 completely coincides with the amplitude of the video signal obtained from the reproduction digital processing circuit 5 in FIG. 1A.

FIG. 1C shows the recording signal block of VTR signals in the case of correcting the frequency response in the second embodiment. It is assumed that a reproduced signal of another set of VTR to which the present invention is applied has been inputted to the input terminal 27. This video signal is connected into a digital video signal by the analog-to-digital converter 10 after the amplitude of this video signal has been controlled by a frequency response variable circuit 32. This digital video signal is supplied to the recording digital processing circuit 11 as well as to a reference signal extraction circuit 33.

Only the frequency response reference signal shown in FIG. 2 is extracted from the reference signal extraction circuit 33 and is applied to a comparator 35. The frequency response reference signals from the reference signal extraction circuit 33 and the reference signal generator 34 are compared in the comparator 35, and the frequency response variable circuit 32 is controlled based on the error obtained as a result of the comparison. As a result, the frequency response of the digital video signal taken in by the analog-to-digital converter 10 completely coincides with the frequency response of the video signal obtained from the reproduction digital processing circuit shown in FIG. 1A.

Figure 1D:
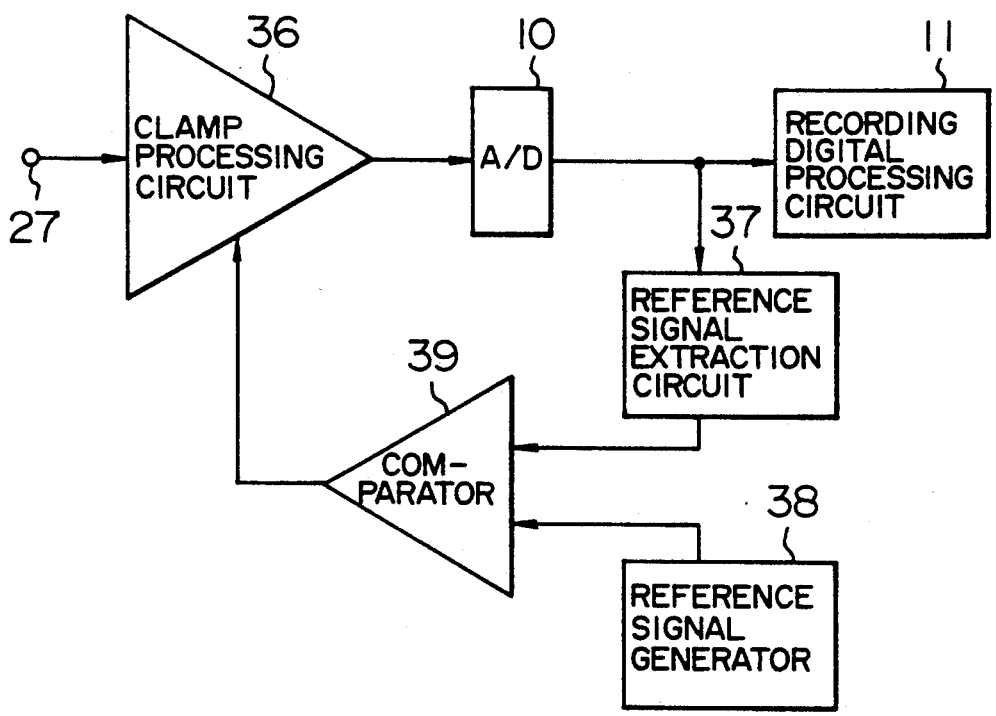
FIG. 1D is a block diagram of the VTR record processing system for correcting the signal DC potential of the first invention.

FIG. 1D shows a recording signal block of VTR signals in the case of correcting a DC potential in the third embodiment. It is assumed that a reproduced signal of another set of VTR to which the present invention is applied has been inputted to the input terminal 27. This video signal is converted into a digital video signal by the analog-to-digital converter 10 after the DC potential of the video signal has been controlled by a clamp processing circuit 36. This digital video signal is supplied to the recording digital processing circuit 11 as well as to a reference signal extraction circuit 37.

Only the DC potential reference signal shown in FIG. 2 is extracted from the reference signal extraction circuit 37 and is applied to a comparator 39. The DC potential reference signals from the reference signal extraction circuit 37 and the reference signal generator 38 are compared by the comparator 39, and the clamp circuit 36 is controlled based on the error obtained as a result of the comparison. As a result, the DC potential of the digital video signal taken in by the analog-to-digital converter 10 completely coincides with the DC potential of the video signal obtained from the reproduction digital processing circuit 5 shown in FIG. 1A.

As another embodiment, generally a digital-to-analog converter has upper-limit and lower-limit reference potential input terminals for setting quantization levels to an input signal. It is also possible to control the signal amplitude and signal DC potential as controlled in the first and the third embodiments, by controlling this reference potential input. For example, when the level of the video signal is smaller than the reference value, the level of the digital video signal obtained by the analog-to-digital converter increases equivalently by narrowing the set difference between the upper-limit and lower-limit reference potentials from the normal difference level. The above method is possible although the explanation by the use of a drawing is omitted here.

In actual practice, it is rare that the embodiments 1 to 3 are carried out independently, but each of the functions is carried out in sequence by combining the units used in these embodiments as shown in FIG. 1E. Numbers of the circuits shown in FIG. 1E are all those number used in FIGS. 1B to 1D, and the circuits of the same numbers as those in FIGS. 1B to 1D operate the same functions. In other words, in FIG. 1E, a video signal applied to the input terminal 27 is passed through the amplitude variable circuit 28, the frequency variable circuit 28 and the clamp processing circuit 36 to sequentially correct the video amplitude, frequency response and DC component respectively.

A second invention (correction by digital calculation) will be explained next with reference to FIGS. 7 and 8.

Reproduction processing of a VTR signal and the reference signal handled here are the same as these explained in FIGS. 1A and 2 in the first invention.

FIG. 7 is a diagram showing the whole of the transmission path correction apparatus, and FIGS. 8A–D are configuration diagrams showing example of the digital filters to be used in a characteristic varying unit 100 in FIG. 7.

To simplify the explanation, the apparatus for managing the amplitude of the video signal will be explained first. It is assumed that a reproduced signal of another set of VTR to which the present invention is applied has been inputted to the input terminal 27. This video signal is converted into a digital video signal by the analog-to-digital converter 10. The amplitude of the digital video signal is controlled by the characteristic varying unit 100. This digital video signal is supplied to a rounding circuit 102 for rounding the bit number as well as to a reference signal extraction circuit 103. Then, the output from the rounding circuit 102 is sent to the recording digital signal processing circuit 11.

Only the amplitude reference signal shown in FIG. 2 is extracted from the reference signal extraction circuit 103 and is applied to the comparator 101. The amplitude reference signals from the reference signal extraction circuit 103 and the reference signal generator 30 are compared by a comparator 101, and the characteristic varying unit 100 is controlled based on the error obtained as a result of the comparison. As a result, the amplitude of the digital video signal outputted from the characteristic varying unit 100 completely coincides with the amplitude of the video signal obtained from the reproduction digital processing circuit 5 shown in FIG. 1A.

Figure 8A:
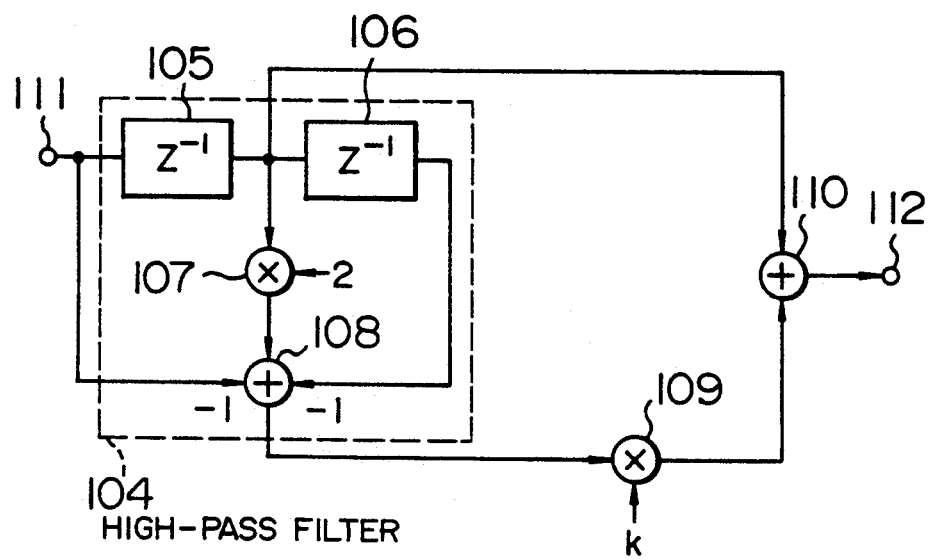
FIG. 8A is a block diagram showing the digital filter for varying the frequency response.
Figure 8B:
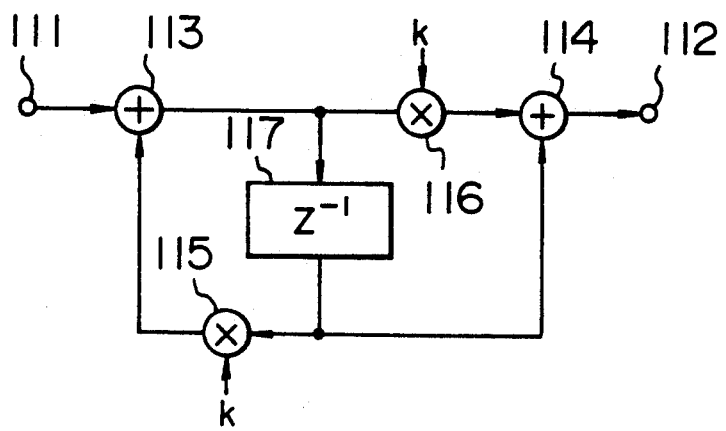
FIG. 8B is a block diagram showing the digital filter for varying the sampling phase.
Figure 8C:
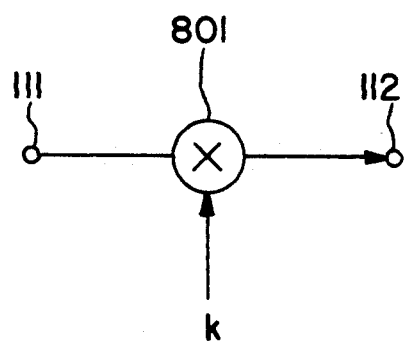
FIG. 8C is a block diagram showing a digital filter for varying the amplitude.

In this case, the characteristic varying unit 100 comprises as shown in FIG. 8C a multiplier 801 which varies a multiplication coefficient to alter the amplitude of a digital video signal. In order to avoid distortion due to a calculation error, the bit number of the analog-to-digital converter 10 is set to be higher than the bit number to be rounded by a rounding circuit 102 (the bit number to be recorded and reproduced in a VTR).

Figure 8D:
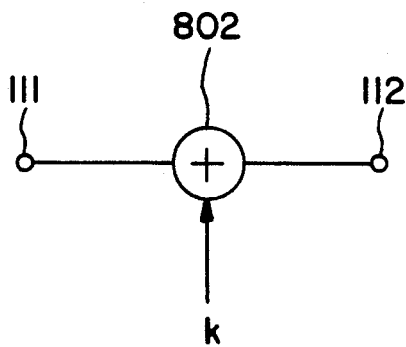
FIG. 8D is a block diagram showing a digital filter for varying the DC potential.

In the case of correcting the DC potential (clamp correction), the characteristic varying unit 100 comprises as shown in FIG. 8D an adder 802 which adds a correction potential (correction value) to the digital video signal obtained by the analog-to-digital converter 10 to correct clamps.

In the case of correcting a frequency response, the characteristic varying unit 100 comprises, for example, a digital filter as shown in FIG. 8A to correct the frequency response.

104 designates a high-pass filter of a linear phase which comprises delay units 105 and 106, a multiplier 107 and an adder 108. An adder 110 and a multiplier 109 are used to freely add and subtract high-frequency components to and from the original signal to vary the frequency response.

In the case of correcting a sampling phase, a phase reference such as a color sub-carrier is added as the reference signal shown in FIG. 2, and the characteristic varying unit 100 comprises, for example, a digital filter as shown in FIG. 8B to correct the sampling phase.

FIG. 8B shows an infinite impulse response (IIR) filter of the all-pass type which can vary the phase characteristics by varying the coefficients of multipliers 115 and 116 while maintaining the frequency response as flat. By using this filter, it is possible to compensate the sampling phase.

A third invention (a method of restricting vibrations) will be explained next with reference to FIGS. 9 to 12.

In the case of the digital control circuit according to the first and second inventions, it is general that a fine vibration remains after the vibrations have been astringed, as described in the JP-A-60-10880, "A digital clamping circuit". When a control loop is tried to be always controlled, control error information is necessary for the control. In the case of an analog control circuit, error information becomes a limitless small level, but in the case of digital control, the quantity of vibration depends on the quantization precision of an A/D converter even if error information is minimum.

When the VTR's used in FIG. 1 are D2 VTR's, the D2·VTR's handle 8-bit digital data so that 8-bit devices are used in principle as the digital-to-analog converter 6 and the analog-to-digital converter 10. In this case, a digital code [200] corresponds to the amplitude reference signal of the 100% white level in FIG. 2. When this amplitude reference signal is again extracted by the reference signal extractor 29, the signal is taken by fine vibrating the value of the codes [200] and [201]. When the digital code from the reference signal extractor 29 is equal to or lower than the digital code [200], the comparator 31 controls the amplitude varying unit 28 to increase the amplitude, and when the digital code from the reference signal extractor 29 is equal to or higher than the digital code [201], the comparator 31 controls the amplitude varying unit 28 to lower the amplitude.

When the video signal from the reproduction digital processing circuit 5 is at the level of 100% white which is the same as the reference signal, the analog video signal in the analog-to-digital converter 10 takes the values of the codes [200] and [201] as the same as the reference signal. Accordingly, in this case, the video signal has not been correctly transmitted in analog.

To solve the above problem, the present invention proposes the following four methods so that the video signal can be transmitted as an accurate code.

A first method is to use an analog-to-digital converter of a bit number greater than the bit number of the video signal handled by the VTR's (8 bits in the case of the D2·VTR's) to avoid the occurrence of a fine vibration as described above in the digital video signal used in the recording digital processing circuit 11. The operation will be explained below with reference to FIG. 9. It is assumed that a 9-bit device is used as the analog-to-digital converter 10 and the code [200] has been allocated as the reference signal at the 100% white level in the reference signal generator 25.

Figure 9:
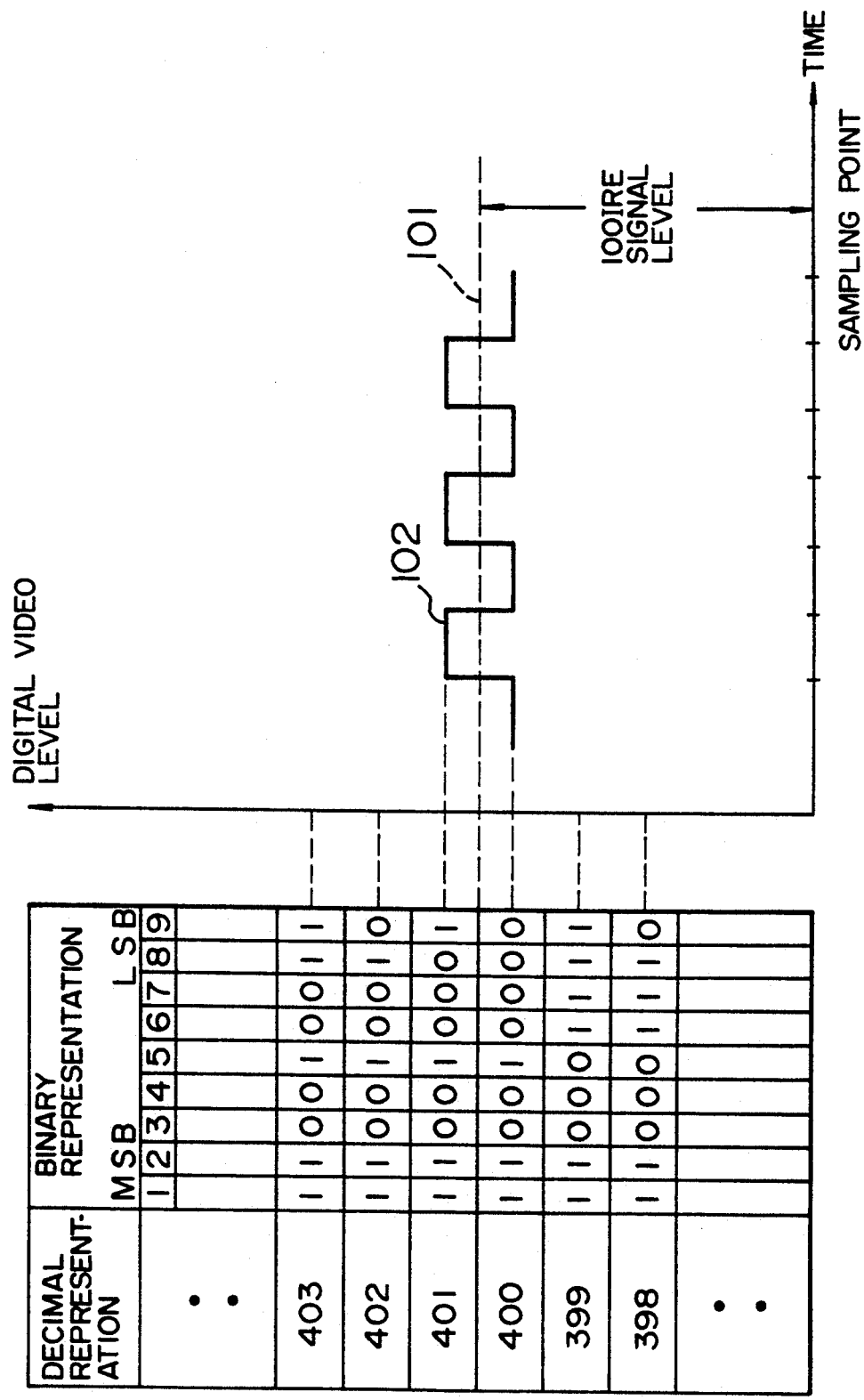
FIG. 9 is an explanatory diagram to be used for explaining the operation in a first embodiment of a third invention.

The left side in FIG. 9 shows the correspondence between the decimal representation and the binary representation of 9-bit digital data from the analog-to-digital converter 10. The right side of FIG. 9 shows the relation between the digital video amplitude in the vertical axis and the time of sampling points in the horizontal axis. The code [400] in the decimal representation ([110010000] in the binary representation] corresponds to the resolution of 9 bits for the 100% white level reference signal.

When the digital code from the reference signal extractor 29 is [400] or below, the comparator 31 in FIG. 1B controls the amplitude varying unit 28 to increase the amplitude, and when the digital code from the reference signal extractor 29 is [401] or above, the comparator 31 controls the amplitude varying unit 28 to lower the amplitude. Therefore, the average amplitude of the reference signal of the 100% white level in the state of the amplitude control is at the level of a dot chain 101 in FIG. 9. This level corresponds to the border level of the codes [400] and [401] for the analog-to-digital converter 10. Accordingly, the output from the analog-to-digital converter 10 vibrates between the codes [400] and [401] as shown by the waveform 102 in FIG. 9. When attention is paid to the higher 8 bits of the binary display in FIG. 9, the codes [400] and [401] take the value of [11001000] in the binary representation.

As described above, by using a device of a large bit number as the analog-to-digital converter 10, it is possible to avoid the influence of vibrations attributable to the digital control on the main line system of the video (in this case the high order 8 bits).

A second method will be explained next. The second method is to use a digital-to-analog converter of a larger bit number than the bit number of the video signal handled by the VTR's (8 bits in the case of the D2·VTR's), to slightly deviate the reference signal value of the 100% white level thereby to prevent a fine vibration from appearing in the video signal of the main line system. The operation will be explained with reference to FIG. 10. A 9-bit device is used as the digital-to-analog converter 6, and a code [401] (a code [200.5] in the 8-bit resolution) slightly deviated from the normal code [400] (a code [200] in the 8-bit resolution) in the 9-bit resolution is allocated as the reference signal of the 100% white level in the reference signal generator 25.

The left side of FIG. 10 shows the correspondence between the decimal representation and the binary representation of 8-bit digital data from the analog-to-digital converter 10. When the digital code from the reference signal extractor 29 is equal to or less than the code [200], the comparator 31 controls the amplitude varying unit 28 to increase the amplitude, and when the digital code from the reference signal extractor 29 is equal to or above the code [201], the comparator 31 controls the amplitude varying unit 28 to lower the amplitude. Therefore, the average amplitude of the 100% white level in the state of the amplitude control is at the level of a dot chain 103 in FIG. 10. This level corresponds to the border level between the codes [200] and [201] for the analog-to-digital converter 10. Accordingly, the output from the analog-to-digital converter 10 vibrates between the codes [200] and [201] as shown in the waveform 104 in FIG. 10.

An amplitude (a code [200.5] in the 8-bit resolution) slightly larger than that of the normal 100% white level signal (a code [200] in the 8-bit resolution) is allocated to the reference signal from the reference signal generator 25. The average level (a dotted line 105 in FIG. 10) of the 100% white level video signal of the main line system is lower than the average level 103 of the reference signal by a half of one step of the 8-bit resolution. The average level 105 of this 100% white level video signal exists at the center of the code [200] of the analog-to-digital converter 10.

Accordingly, the video signal of the 100% white level is always analog-to-digital converted stably in the code [200] as shown by the solid line waveform 106.

As described above, by using a device of a large bit number for the digital-to-analog converter 6 and by slightly deviating the reference signal value of the 100% white level, it is possible to prevent the vibrations attributable to the digital control from influencing the main line of the video (in this case, the high 8 bits).

A third method will be explained with reference to FIGS. 11 and 12. The third method is to use the same bit number (8 bits in the D2-VTR's) as that of the video for the analog-to-digital converter and the digital-to-analog converter to be used, thereby to realize in analog to slightly deviate the reference signal level of the second method.

Figure 11A:
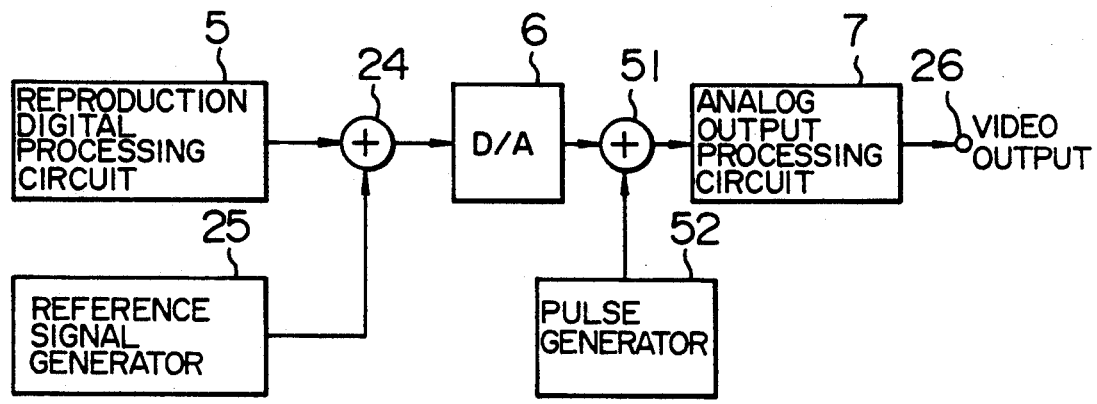
FIG. 11A is a block diagram showing the configuration of the reproduction processing system in a third embodiment of the third invention.
Figure 11B:
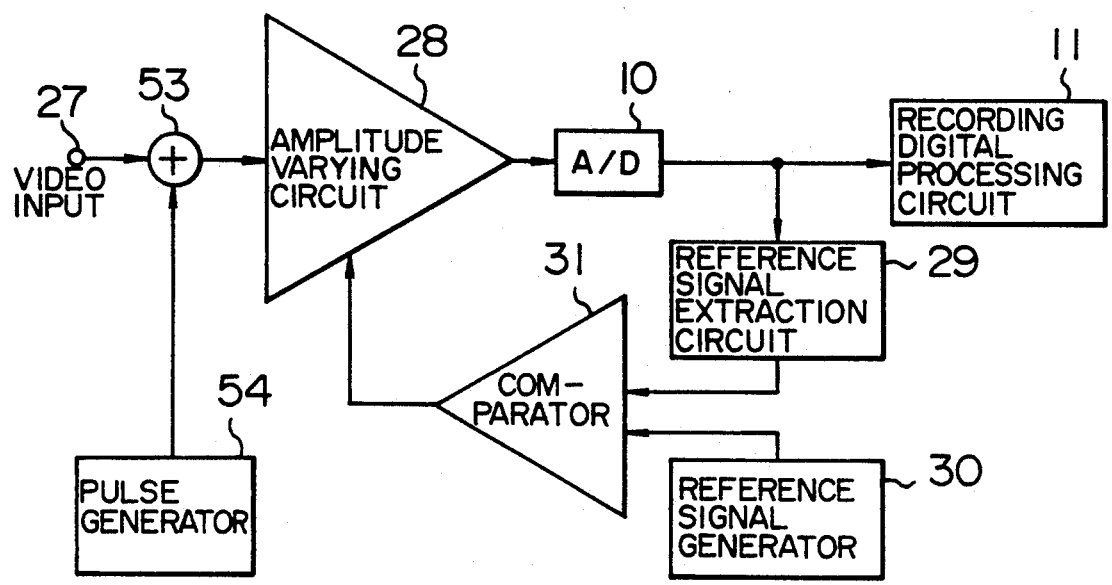
FIG. 11B is a block diagram showing the configuration of the record processing system in the third embodiment of the third invention.
Figure 12:
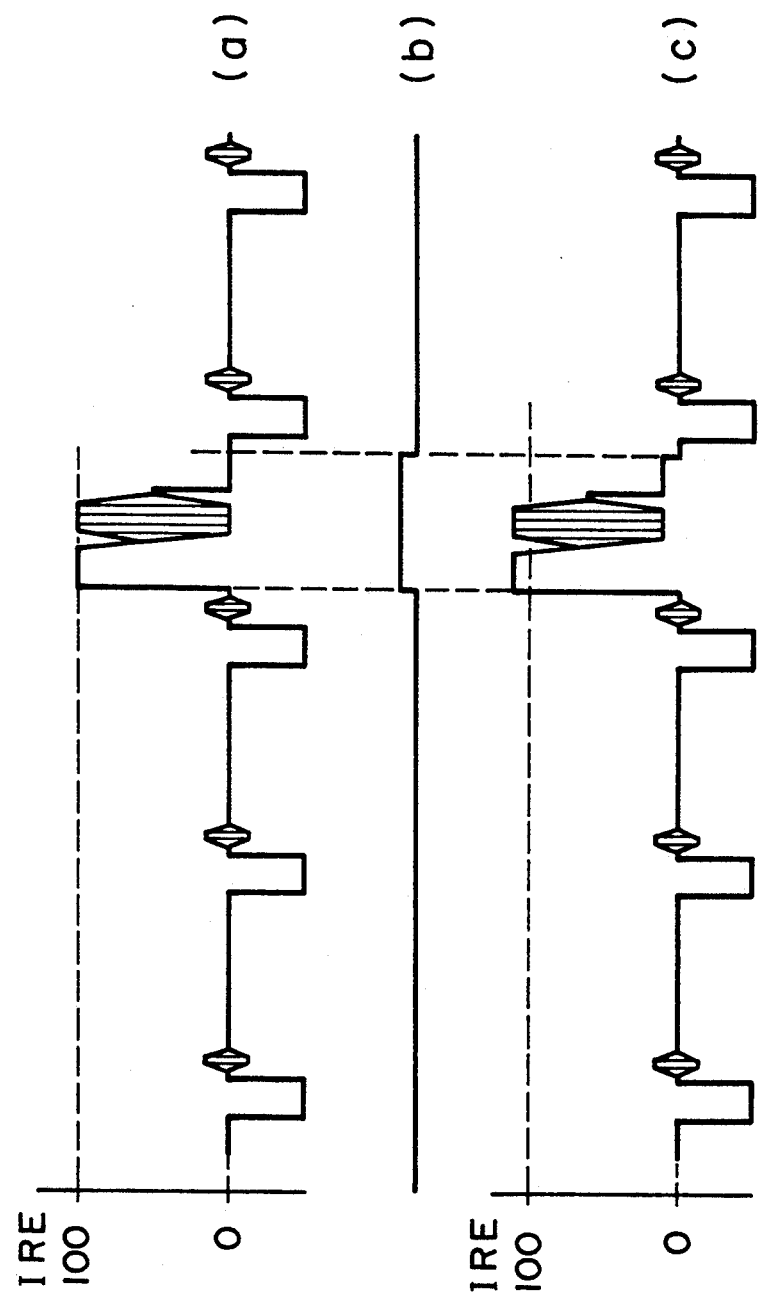
FIG. 12 is an explanatory diagram for explaining the operation of the third embodiment of the third invention.

FIG. 11 is substantially the same as FIG. 11, and only different portions will explained. According to the third method, pulse generators 52 and 54 and adders 51 and 54 are added to any one of the VTR reproduction processing (FIG. 11A) or the VTR recording (FIG. 11B). A pulse signal as shown in FIG. 11B (there is a pulse in the timing of the reference signal) is added to the video signal to which the reference signal of FIG. 12A has been multiplexed, and only the reference signal level is processed as shown in FIG. 11C. The level variation processed here is made the same as the 0.5 quantization step in the 8-bit resolution in the same manner as the level has been deviated in the second method. By this arrangement, the 100% white level of the video signal to be taken in by the analog-to-digital converter 10 is stably digitally converted into the code [200], in the same manner as the second method.

As another embodiment of the third method, the amplitude varying unit 28 in FIG. 1B is controlled in only the reference signal area which has been superposed on the analog video signal without specially providing the pulse generators 52 and 54 and adders 51 and 54, to change the amplitude of the analog video signal.

Though a drawing for the explanation is omitted, when the level variation processed here is made the same as the 0.5 quantization step in the 8-bit resolution in the same manner as the level deviation in the second method, it is possible that the 100% white level of the video signal to be taken in by the analog-to-digital converter 10 is stably digitally converted into the code [200], in the same manner as the second method.

A fourth method will be explained last. This method can be regarded as a development of the third method. In general, the digital-to-analog converter has input terminals for upper-limit and lower-limit reference potentials to set quantization levels for an input signal. It is also possible to control the signal amplitude by controlling the reference potential input. For example, by narrowing the difference between the set potentials of the upper and lower reference potentials, the level of the digital video signal obtained from the analog-to-digital converter increases equivalently.

Although a drawing for the explanation is omitted, the upper and lower limit reference potentials of the analog-to-digital converter 10 in FIG. 1 are controlled only in the area of the reference signal which has been superposed on the analog video signal, thereby to change the amplitude of the analog video signal. When the level variation processes here is made the same as the 0.5 quantization step in the 8-bit resolution in the same manner as the level deviation in the second method, it is possible that the 100% white level of the video signal to be taken in by the analog-to-digital converter 10 is stably digitally converted into the code [200], in the same manner as the second method.

As described above, a dubbing system is used which is a cascade connection of two sets of digital VTR's, and a reference signal of an amplitude, a DC potential, a frequency response and a sampling phase is superposed as a predetermined digital value onto an output video signal of a reproducer. Then, in a recorder to which the video signal is connected through an analog transmission path, a difference is detected between the digital value of the reference signal in the digital video signal obtained from the analog-to-digital converter of the recorder and the above predetermined digital value. Based on the result of the detection, the amplitude, DC current, frequency response and sampling phase of the video signal is corrected by an analog circuit or by digital calculation.

By the above arrangement, it is possible to correct the video signal even if there is a variation in the analog circuit or even if there is an attenuation of the signal in the analog transmission path, thereby to prevent quantization distortions from occurring in the dubbing operation.

On the above description, the dubbing system using digital VTR's has been mainly explained. However, it should be noted that an apparatus can be applied for any purpose and the similar effect can be obtained if the apparatus used is for obtaining a digital signal again by an analog-to-digital converter from an analog signal that has been obtained by converting a digital signal into an analog signal by a digital-to-analog converter.

I claim:

1. An automatic correction apparatus for a video signal of a digital VTR, which defines a transmission path for converting a first digital video signal, having a first number of bits, into an analog video signal by digital-to-analog conversion means, transmitting said converted analog video signal and converting said converted analog video signal into a second digital signal by analog-to-digital conversion means, comprising:
   reference signal superposition means for superposing a first reference signal, of a predetermined digital value, onto said first digital video signal;
   comparison means for comparing a second reference signal in said second video signal with said predetermined digital value; and
   characteristic varying means for varying the characteristics of said second digital video signal, to control said characteristic varying means based on the result of a comparison by said comparison means,
   wherein said analog-to-digital conversion means has a greater resolution than said first number of bits of said first digital video signal.

2. An automatic correction apparatus for a video signal of a digital VTR according to claim 1, wherein said reference signal superposition means superposes said first reference signal during a vertical blanking period of said first digital video signal.

3. An automatic correction apparatus for a video signal of a digital VTR according to claim 1, wherein said first reference signal is a signal representative of a reference amplitude of the video signal and said characteristic varying means varies the amplitude of the video signal.

4. An automatic correction apparatus for a video signal of a digital VTR according to claim 3, wherein said characteristic varying means comprises a multiplier, and an amplitude of said second digital video signal is altered by changing a coefficient of said multiplier.

5. An automatic correction apparatus for a video signal of a digital VTR according to claim 1, wherein said first reference signal is a signal representative of the amplitude of the video signaling a high-frequency range and said characteristic varying means varies the frequency characteristics of the video signal.

6. An automatic correction apparatus for a video signal of a digital VTR according to claim 5, wherein said characteristic varying means comprises a digital filter, and frequency characteristics of said second digital video signal are altered by changing a coefficient of said digital filter.

7. An automatic correction apparatus for a video signal of a digital VTR according to claim 1, wherein said first reference signal is a signal representative of a reference DC potential of the video signal and said characteristic varying means varies the DC potential of the video signal.

8. An automatic correction apparatus for a video signal of a digital VTR according to claim 7, wherein said characteristic varying means comprises an adder, and a DC potential of said second digital video signal is altered by changing an added value of said adder.

9. An automatic correction apparatus for a video signal of a digital VTR according to claim 1, wherein said first reference signal is a signal representative of a sampling phase of the video signal and said characteristic varying means varies a sampling phase of the video signal.

10. An automatic correction apparatus for a video signal of a digital VTR according to claim 9, wherein said characteristic varying means comprises a digital filter, and a sampling phase of said second digital video signal is altered by changing a coefficient of said digital filter.

11. An automatic correction apparatus for a video signal of a digital VTR, for receiving and transmitting a first digital video signal that has a first number of bits and that has been reproduced from a recording medium, said apparatus comprising:
  reference signal superposition means for superposing a first reference signal, having a predetermined digital value, onto said first digital video signal;
  digital-to-analog conversion means for converting said first digital signal into a first analog signal and outputting said first analog signal to a transmission medium;
  analog-to-digital conversion means for receiving said first analog signal form said transmission medium and for converting said first analog signal into a second digital signal, said analog-to-digital conversion means having a greater resolution than said first number of bits of said first digital video signal;
  reference signal generating means for generating a second reference signal;
  reference signal extraction means for extracting a third reference signal, corresponding to said first reference signal, from said second digital video signal;
  comparison means for comparing said second and third reference signals to each other and generating a resultant signal; and
  characteristic varying means for varying a characteristic of said second digital video signal in accordance with said resultant signal.

12. An automatic correction apparatus for a video signal of a digital VTR according to claim 11, wherein said reference signal superposition means superposes said first reference signal during a vertical blanking period of said first digital video signal.

13. An automatic correction apparatus for a video signal of a digital VTR according to claim 11, wherein said first reference signal is a signal representative of a reference amplitude of the video signal and said characteristic varying means varies the amplitude of the video signal.

14. An automatic correction apparatus for a video signal of a digital VTR according to claim 13, wherein said characteristic varying means comprises a multiplier, and an amplitude of said second digital video signal is altered by changing a coefficient of said multiplier.

15. An automatic correction apparatus for a video signal of a digital VTR according to claim 11, wherein said first reference signal is a signal representative of the amplitude of the video signal in a high-frequency range and said characteristic varying means varies the frequency characteristics of the video signal.

16. An automatic correction apparatus for a video signal of a digital VTR according to claim 15, wherein said characteristic varying means comprises a digital filter, and frequency characteristics of said second digital video signal are altered by changing a coefficient of said digital filter.

17. An automatic correction apparatus for a video signal of a digital VTR according to claim 11, wherein said first reference signal is a signal representative of a reference DC potential of the video signal and said characteristic varying means varies the DC potential of the video signal.

18. An automatic correction apparatus for a video signal of a digital VTR according to claim 17, wherein said characteristic varying means comprises an adder, and a DC potential of said second digital video signal is altered by changing an added value of said adder.

19. An automatic correction apparatus for a video signal of a digital VTR according to claim 11, wherein said first reference signal is a signal representative of a sampling phase of the video signal and said characteristic varying means varies a sampling phase of the video signal.

20. An automatic correction apparatus for a video signal of a digital VTR according to claim 19, wherein said characteristic varying means comprises a digital filter, and a sampling phase of said second digital video signal is altered by changing a coefficient of said digital filter.

* * * * *